UNITED STATES PATENT OFFICE.

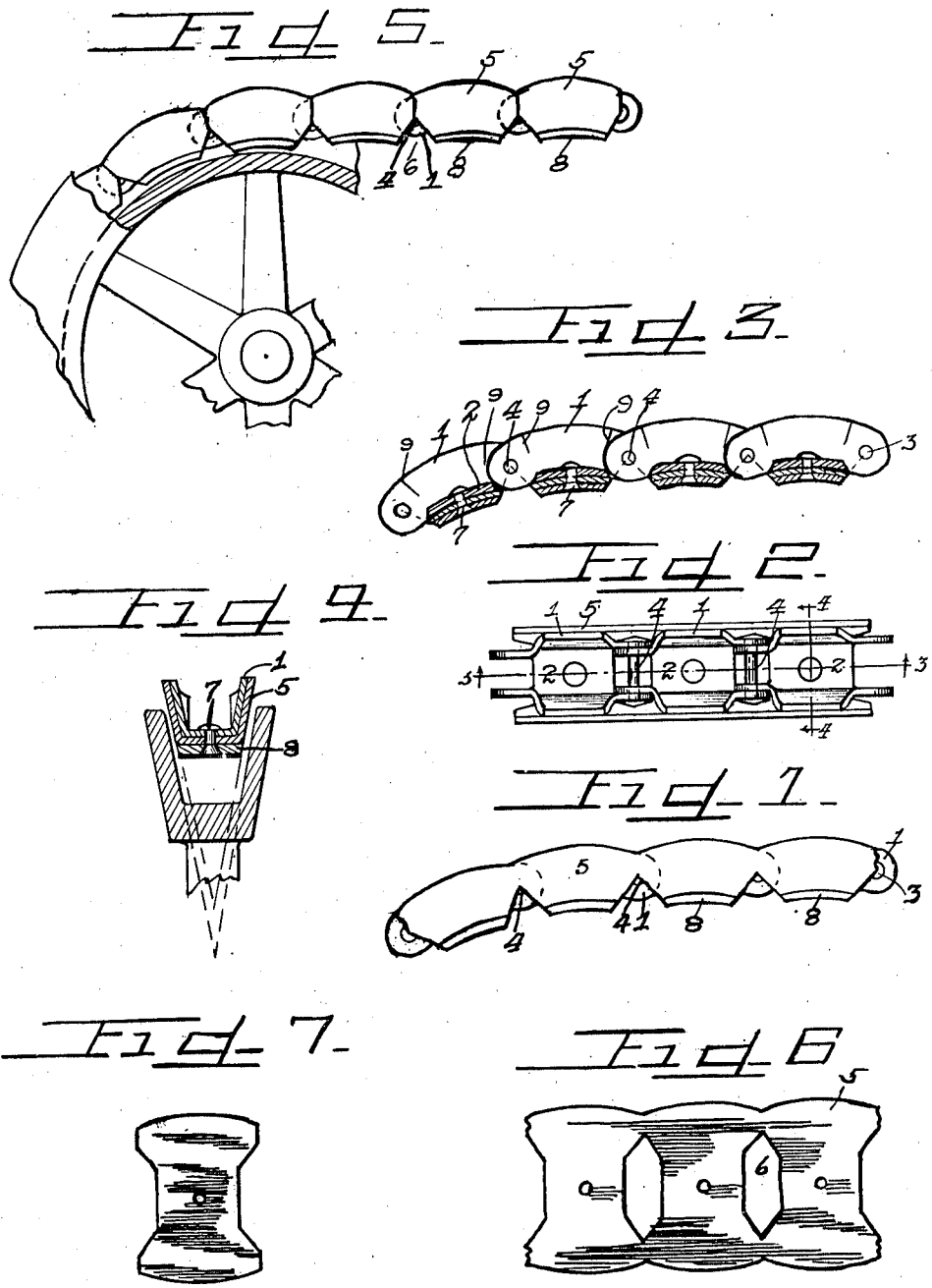

JOHN E. DUKELOW, OF CHICAGO, ILLINOIS.

CHAIN DRIVING-BELT.

982,802.  Specification of Letters Patent.  Patented Jan. 31, 1911.

Application filed April 18, 1908. Serial No. 427,808.

*To all whom it may concern:*

Be it known that I, JOHN E. DUKELOW, a citizen of the United States residing at No. 1197 Wilcox avenue, in the city of Chicago, county of Cook, and State of Illinois, have invented certain new and useful Improvements in Chain Driving-Belts, of which the following is a description.

My invention relates to means for transmitting power from one rotatable member to another by means of suitably formed sheaves mounted upon the members and connected by a member coöperating with the peripheries of the sheaves.

The object of my invention is to produce a simple, reliable, and efficient device of the kind described; one adapted to transmit power with the least amount of loss of power and distortion of the driving member.

To this end my invention consists in the novel construction, arrangement and combination of parts, herein shown and described and more particularly pointed out in the claims.

In the accompanying drawings wherein like or similar reference characters indicate like or corresponding parts; Figure 1, is a side elevation of a section of my improved belt. Fig. 2, is a plan view of the same. Fig. 3, is a section taken substantially on line 3—3 of Fig. 2. Fig. 4, is a section taken substantially on line 4—4 of Fig. 2, and showing a transverse section of the groove with which my belt is adapted to operate. Fig. 5, is an elevation of a slightly modified form of my device shown in connection with a portion of a sheave with which it is adapted to coöperate. Figs. 6 and 7, are details of the friction material where a single piece of friction material is used with a plurality of links and where a single piece is used with each link respectively.

In the preferred form shown in the drawings, my device consists of a plurality of sheet metal links each comprising two similar side walls 1—1 suitably spaced from each other and united by a transverse web or connecting member 2, formed integrally therewith. The side walls 1—1 may be of any suitable form but are preferably curved edgewise to approximately conform to the arc of the sheave with which the chain is adapted to coöperate. The ends of the side walls are preferably rounded and provided with an opening 3, adapted to receive a rivet 4, or other suitable means for pivotally connecting the ends of the adjacent links.

In the preferred construction the ends of the side walls adjacent the openings 3, extend beyond the connecting member 2. These projecting walls or ears are formed substantially parallel to each other, with the distance between the walls at one end corresponding to the distance from outside to outside of the walls at the opposite end so that in assembling the links one end of each link will fit between the walls of the next adjacent link. The intermediate portion of each side wall is preferably divergent or flared outward from the connecting member 2, to correspond to the form of the groove in the sheave with which the link is adapted to coöperate. The connecting member or web 2, preferably extends between the central portions of the walls at their inner edges but does not extend sufficiently toward the ends of the link to interfere with the free movement of the links when in operation.

Any suitable friction material, such for example, as leather, rubber, vulcanite or the like, may be provided to inclose the side walls of the link and form a friction surface to coöperate with the walls of the groove in the sheave. This material may consist of a single flexible member extending longitudinally of the chain and attached to a plurality of the links, or a plurality of such members, or if preferred, a single member for each link, depending upon the size of the chain and the nature of the service for which the device is intended. In the form shown in Fig. 1 of the drawings, this friction material 5, consists of a single flexible piece arranged to inclose both side walls of the links and the webs or connecting members 2, attached to the links only at the connecting members by suitable means to rigidly maintain the same in position. In this form where a single flexible piece of friction material is attached to a number of links I prefer to form an opening 6, through the central portion of the strip positioned at the intersection of the links to permit free movement between the links. In the preferred form these openings are provided with substantially parallel sides of sufficient length to extend across the inner face of the links and with ends formed to extend substantially to the center of the opening 3, so that when the friction material is attached in position upon the links the openings 6 will commence at one side substantially at the center of the rivet connecting the links and diverge to the inner edge of the side wall, thence substantially parallel across the inner face of the link and converging to the center of the rivet at the opposite side. Where a separate piece of friction material is provided for each link, substantially the same form is employed, the end of each piece terminating on a line extending from the center of the end of each opening outward.

Any suitable means may be employed to secure the friction material to the link, and in the preferred form shown a rivet 7, is provided extending through that portion of the friction material upon the face of the link, through the connecting member 2, near its center for this purpose. Also to avoid as far as possible unnecessary wear upon the friction material where it bends at the sharp corner of the link a shield 8, is provided formed of any suitable material preferably of leather, vulcanite, or the like, to cover that portion of the friction material inclosing the face of the link and prevent the same from coming in contact with the sides of the groove of the sheave with which the belt is coöperating.

In the preferred construction the shield 8, is secured in position by the rivet 7, above described extending through both the shield and the friction material.

When constructed as above described the flaring or divergent portions of the side walls 1—1 may be formed to accurately fit the peripheral channel or groove in the sheave so that when in operation the shield 8, will not reach the bottom of the groove. In the preferred construction however, I have found it advisable to form the side walls of the links slightly more divergent than the groove in which the same is to operate. When so formed the walls of the links being constructed of resilient material, there is a resilient wedging action between the walls of the links and of the groove in the sheave tending to greatly increase the efficiency of the device. If desired to increase this resilient action a slot or cut 9, may be provided at each end of the flared portion of the side wall partially severing the flared portion of the side wall from the parallel portions at its ends thus leaving the flared portion free to adjust itself to the form of the groove with which it is in engagement.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described, a plurality of similar links each comprising a pair of side walls, suitably spaced from each other and a part positioned between said side walls and connected to one edge of each with the ends of each side wall projecting beyond said part, in combination with a cushion arranged to inclose the sides and connecting part of each link, and means for attaching said cushion to said link.

2. In a device of the kind described, a plurality of similar links each comprising a pair of side walls suitably spaced and laterally divergent from each other, and a part positioned between said side walls and connected to their proximate edges with the end of each side wall projecting beyond said part, in combination with a cushion arranged to inclose the sides and connecting part of each link, and means for attaching said cushion to said link.

3. In a device of the kind described, a plurailty of similar links each comprising a pair of side walls suitably spaced from each other, the ends of said side walls being substantially parallel and the intermediate portions laterally divergent from each other, and a part connecting said walls at one edge, in combination with a cushion arranged to inclose the sides and connecting part of each link, and means for attaching said cushion to said connecting part.

4. In a device of the kind described, a plurality of similar links each comprising a pair of side walls suitably spaced from each other and provided with a resilient portion intermediate its ends partially detached from said ends and a part positioned between said side walls connected to one edge of each, in combination with a cushion arranged to inclose the sides and connecting part of each link, and means for attaching said cushion to said link.

5. In a device of the kind described, a plurality of similar links each comprising a pair of side walls suitably spaced from each other and provided with a resilient portion intermediate its ends partially detached from said ends, and a part positioned between, and formed integral with, said side walls and connected to one edge of each with the ends of each side wall projecting beyond said part, in combination with a cushion arranged to inclose the sides and connecting part of each link, and means for attaching said cushion to said link.

6. In a device of the kind described, a plurality of similar links each comprising a pair of side walls suitably spaced from each other, each provided with a resilient portion intermediate its ends partially severed therefrom, and a part connecting said walls at one edge, in combination with a cushion arranged to inclose the sides and connecting part of each link, and means for attaching said cushion to said link.

7. In a device of the kind described, a plurality of similar links each comprising a pair of side walls, suitably spaced from each other and a part positioned between said side walls and connected to one edge of each, with the ends of each side wall projecting beyond said part, in combination with a cushion arranged to inclose the sides and connecting part of each link, a shield for protecting a portion of said cushion, and means for attaching said cushion and shield to said link.

8. In a device of the kind described, a plurality of similar links each comprising a pair of side walls suitably spaced and laterally divergent from each other and a part positioned between and formed integrally with said side walls and connected to the proximate edges of said walls with the ends of said side walls projecting beyond said part, in combination with a cushion arranged to inclose the sides and connecting part of each link, and means for attaching said cushion to said link.

9. In a device of the kind described, a plurality of similar links each comprising a pair of side walls suitably spaced and laterally divergent from each other and each provided with a resilient portion intermediate its ends partially detached from said ends and a part positioned between and formed integrally with said side walls and connected to the proximate edges of said walls, in combination with a cushion arranged to inclose the sides and connecting part of each link, and means for attaching said cushion to said link.

10. In a device of the kind described, a plurality of similar links each comprising a pair of side walls suitably spaced and laterally divergent from each other, each provided with a resilient portion intermediate its ends and a part connecting said walls at their proximate edges, near the center of each, in combination with a cushion arranged to inclose the sides and connecting part of each link, a shield for protecting a portion of said cushion, and means for attaching said cushion and shield to said connecting part.

11. In a device of the kind described, a plurality of similar links, each comprising a pair of side walls suitably spaced and laterally divergent from each other, each provided with a resilient portion intermediate its ends partly severed therefrom and a part connecting said walls at their proximate edges near the center of each, in combination with a cushion arranged to inclose the sides and connecting part of each link, a shield for protecting a portion of said cushion, and means for attaching said cushion and shield to said connecting part.

12. In a device of the kind described, a plurality of similar links each comprising a pair of side walls suitably spaced and laterally divergent from each other, each provided with a resilient portion intermediate its ends, and a part connecting said walls at their proximate edges near the center of each, in combination with a cushion arranged to inclose the sides and connecting part of each link, and a shield attached to each link for protecting a portion of said cushion, and means for attaching said cushion and shield to said connecting part.

13. In a device of the kind described, a plurality of similar links each comprising a pair of side walls suitably spaced from each other, the ends of said side walls being substantially parallel and the intermediate portions laterally divergent from each other, and a part formed integral with said walls connecting the same at one edge, in combination with a cushion arranged to inclose the sides and connecting part of each link, and means for attaching said cushion to said link.

14. In a device of the kind described, a plurality of similar links each comprising a pair of side walls suitably spaced from each other, the ends of said side walls being substantially parallel, and the intermediate portions laterally divergent from each other, and a part connecting said side walls at their proximate edges, in combination with a cushion arranged to inclose the sides and connecting part of each link, and means for attaching said cushion to said link.

15. In a device of the kind described, a plurality of similar links each comprising a pair of side walls suitably spaced from each other, the ends of said side walls being substantially parallel, and the intermediate portions laterally divergent from each other, and a part connecting said walls at their proximate edges near the center of each, in combination with a cushion arranged to inclose the sides and connecting part of each link, and means for attaching said cushion to said connecting part.

16. In a device of the kind described, a plurality of similar links each comprising a pair of side walls suitably spaced from each other, the ends of said side walls being substantially parallel and the intermediate portions laterally divergent from each other, each provided with a resilient portion intermediate its ends, and a part connecting said walls at their proximate edges, in combination with a cushion arranged to inclose the sides and connecting part of each link, and means for attaching said cushion to said link.

17. In a device of the kind described, a plurality of similar links each comprising a pair of side walls suitably spaced from each other, the ends of said side walls being substantially parallel and the intermediate portions laterally divergent from each other, each provided with a resilient portion intermediate its ends and a part connecting said side walls at their proximate edges, in combination with a continuous cushion extending longitudinally of said chain arranged to inclose the sides and connecting part of a plurality of links, and means for attaching said cushion to each link.

18. In a device of the kind described, a plurality of similar links each comprising a pair of side walls suitably spaced from each other, the ends of said side walls being substantially parallel and the intermediate portions laterally divergent from each other, each provided with a resilient portion intermediate its ends, and a part connecting said side walls at their proximate edges, in combination with a cushion arranged to inclose the sides and connecting part of each link, a shield for protecting a portion of each cushion, and means for attaching said cushion and shield to said connecting part.

19. In a device of the kind described, a plurality of similar links each comprising a pair of side walls suitably spaced from each other, the ends of said side walls being substantially parallel and the intermediate portions laterally divergent from each other, each provided with a resilient portion intermediate its ends partially severed therefrom, and a part connecting said walls at their proximate edges, in combination with a cushion arranged to inclose the sides and connecting part of each link, a shield attached to each link for protecting a portion of said cushion, and means for attaching said cushion and shield to said link.

20. As an article of manufacture a sheet metal link comprising a pair of side walls suitably spaced and laterally divergent from each other, each provided with a resilient portion intermediate its ends partially severed therefrom, and a part connecting said walls at their proximate edges.

21. In a device of the kind described, a plurality of similar pivotally connected links, a cushion formed of a strip of friction material, of suitable form, to cover both sides and the inner face of a plurality of said links, and provided with a transverse opening for each link positioned at the intersection of the several links.

22. The combination with a pulley having a peripheral channel formed with outwardly diverging sides, a chain formed of spaced links of greater width than the least width of the pulley channel, and each link comprising spaced side members and an intermediate transverse web, the sides being of greater length than the webs whereby ears are produced projecting beyond the webs and adapted to be bent inwardly and pivotally united, and a flexible element extending over one edge and the opposite sides of said chain and bearing against the converging sides of the grooves, and means for connecting the said webs to said flexible element.

23. A transmission belt comprising a plurality of links, each formed from a single sheet of metal and comprising spaced sides and an intermediate transverse connecting web of less length than the sides, whereby ears are formed projecting beyond the webs and adapted to be bent inwardly between the same, means for movably connecting the ears of said links, and a flexible element extending over one edge and the opposite sides of said chain, and means for connecting said flexible element to said webs.

24. A transmission belt comprising a plurality of links each formed from a single sheet of metal comprising a body portion having a transverse connecting web and with a pair of ears projecting from each end, the ears at one end spaced apart and the ears at the other end compressed into close relations, with the compressed ears of one link inserted between the spaced ears of the next link, pivot pins extending transversely through said ears, and a flexible element extending over one edge and the opposite sides of said chain and connected to said webs.

25. A transmission belt comprising a plurality of links each formed from a single sheet of metal comprising a body portion having a transverse connecting web and with a pair of ears projecting from each end, the ears at one end spaced apart and the ears at the other end compressed into close relations and the compressed ears of one link inserted between the spaced ears of the next link, pivot pins extending transversely through said ears, and a flexible element secured to said webs and extending over the sides of the links.

In testimony whereof, I have hereunto signed my name in the presence of two (2) subscribing witnesses.

JOHN E. DUKELOW.

Witnesses:
B. CHALMERS,
E. WILLARD.